Sept. 29, 1970  E. E. FOSTER  3,531,060
DETENT FOR SEAT BELT RETRACTOR
Filed Sept. 11, 1968  2 Sheets-Sheet 1

INVENTOR
EDWIN E. FOSTER
BY Ralph W. Kalish
ATTORNEY

Sept. 29, 1970     E. E. FOSTER     3,531,060

DETENT FOR SEAT BELT RETRACTOR

Filed Sept. 11, 1968     2 Sheets-Sheet 2

INVENTOR
EDWIN E. FOSTER
BY Ralph W. Kalish
ATTORNEY

# United States Patent Office 3,531,060
Patented Sept. 29, 1970

3,531,060
DETENT FOR SEAT BELT RETRACTOR
Edwin E. Foster, P.O. Box 714, Austin, Tex. 78767
Filed Sept. 11, 1968, Ser. No. 759,114
Int. Cl. B65h 75/48; A62b 35/02
U.S. Cl. 242—107.2                                5 Claims

ABSTRACT OF THE DISCLOSURE

A detent or stop member for engagement upon a seat belt and having a flange for abutment against the rim of the opening in a seat belt housing so as, by such engagement, to maintain the belt in preselected disposition with respect to the user's body to prevent undue pressure while simultaneously assuring of proper safety tension.

BACKGROUND AND SUMMARY OF THE INVENTION

This invention relates in general to seat belts having powered retractors and more particularly to a detent or stop member for use therewith for controlling the pressure applied by the belt against the user's body.

It is an object of the present invention to provide a detent for engagement upon a seat belt which latter incorporates a spring powered retractor; said detent being adapted for selected disposition upon said belt for engagement with the belt housing, so as to control the extension of said belt for substantially eliminating the application of undue pressure on the user's body.

Another object of the present invention is to provide a detent of the character stated, which may be easily mounted upon said belt by the individual user so as to render the belt comfortable yet safe for the particular user.

It is another object of the present invention to provide a detent of the character stated which upon release of the belt securing means will permit the belt to be properly stored in a wound state within the related housing or casing.

It is a further object of the present invention to provide a detent of the character stated, which may be easily utilized with existing seat belts; not requiring any modification of said belts and being easily removed therefrom.

It is another object of the present invention to provide a detent of the character stated, which may be most economically manufactured; which is easily mounted upon an existing seat belt; which provides a positive latch as long as the belt is in use and which permits ready storing of the belt upon disuse; and which is durable and reliable in usage.

DESCRIPTION OF THE PREFERRED EMBODIMENT

Figure 1:
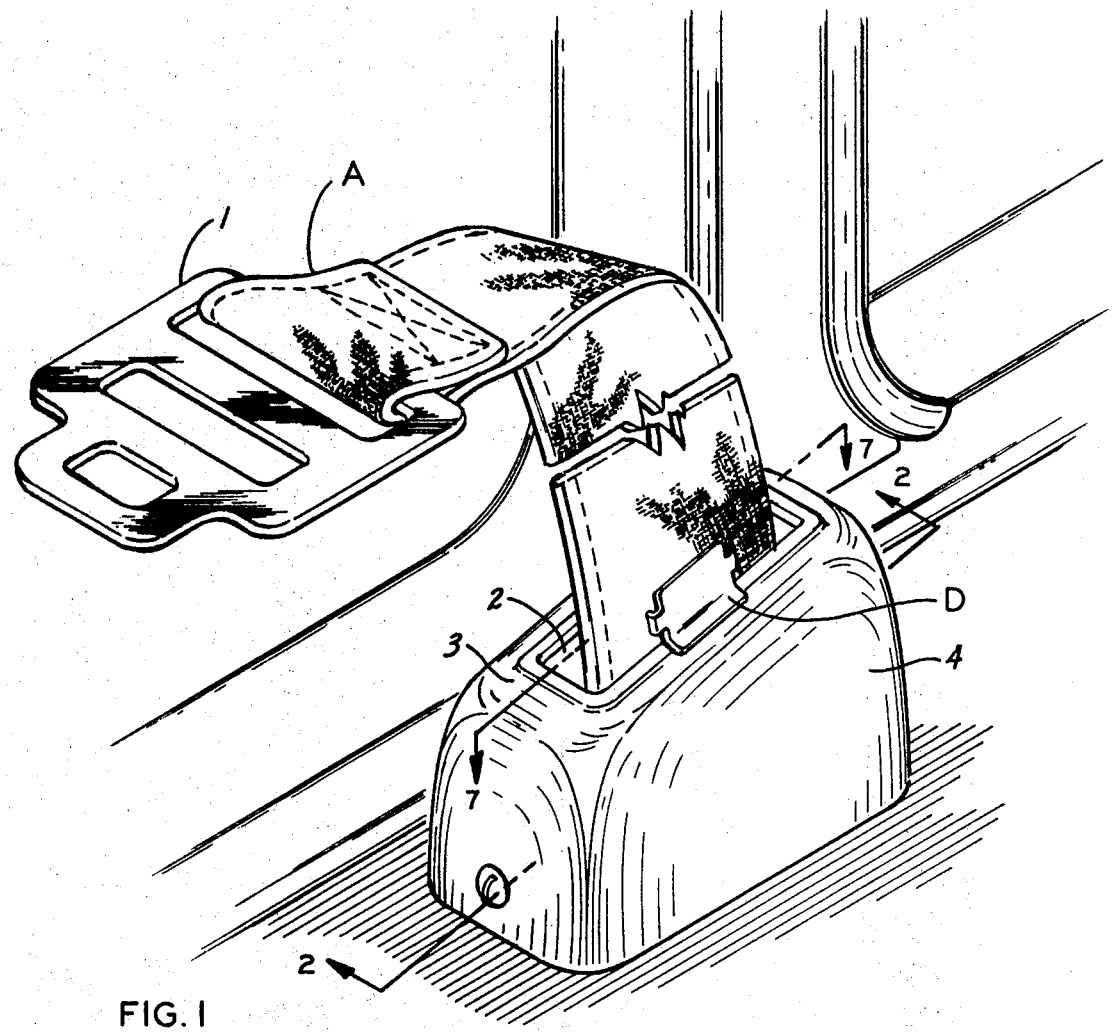
FIG. 1 is a perspective view of a seat belt as in extended condition from its housing and carrying a detent constructed in accordance with an embodying the present invention.

Referring now by reference characters to the drawings which illustrate the preferred embodiment of the present invention. A generally designates a seat belt section, as fabricated of suitable, flexible, strong material and carrying at one end a coupling member, which in the drawings is shown as a conventional male member 1 for reception within the customary female member (not shown) carried upon a companion seat belt section (not shown), with such coupling members being adapted for engagement within the general abdominal zone of the passenger. Seat belt section A extends through an opening 2 provided in the top wall 3 of a conventional seat belt housing or casing 4, normally secured upon the floor board of a vehicle or in any like convenient place. Said top wall 3 of housing 4 is forwardly and downwardly inclined for directing seat belt section A for disposition across the front of the user. Provided within housing 4 is a base plate 5 upstanding from which is a pair of longitudinally spaced apart plates 6, 7 having aligned openings (not shown) for journaling therein of a shaft 8; said plates 6, 7 being presented in planes perpendicular to top wall 3 so that the axis of shaft 8 will be substantially parallel to the plane of top wall 3. Fixed upon shaft 8 for rotation therewith is a drum 9 about the outer surface of which is led to end portion of seat belt section A with the extremity thereof being suitably secured, as by stitching, as at 10, to the confronting portion of said seat belt section, so as to cause said end portion to form a snug loop, indicated at 11, about said drum 9. In order to maintain said loop 11 securely upon drum 9, so as to cause rotation therewith, is a pair of C-clamps 12 which frictionally hold the said end portion upon drum 9 and prevent any relative movement therebetween. Shaft 8 projects beyond plate 7 and upon such extended portion mounts a retractor spring 13 which latter is preferably of coil character and of any suitable type and may be of the character shown and described in U.S. Letters Patent No. 2,833,534. Thus, spring 13 is adapted to urge shaft 8 in a counter-clockwise direction, as indicated by the arrow in FIG. 3, so as to urge said shaft to cause seat belt section A to be wound therearound.

Figure 2:
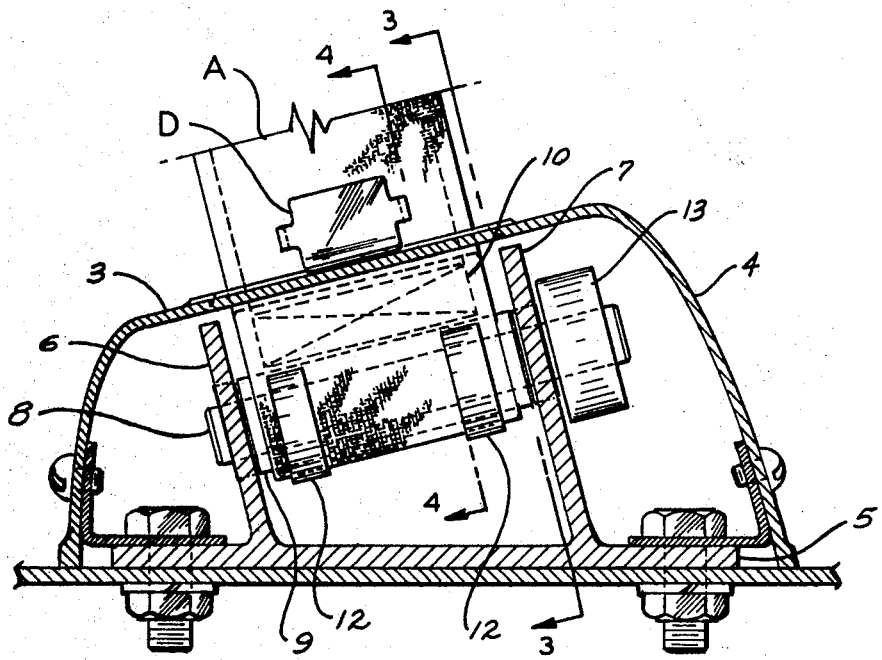
FIG. 2 is a vertical transverse sectional view taken on the line 2—2 of FIG. 1.

By reference to FIG. 2, it will be readily seen that by reason of the relationship of plates 6, 7 to top wall 3 of housing 4, shaft 8 will be so positioned that its axis is substantially parallel to the plane of top wall 3 and thereby assuring that seat belt section A will be suitably presented to the passenger for ready, effective use.

It will thus be seen that spring 13 operates in the conventional manner to cause seat belt section A to be under tension when in extended, operative condition so as to cause pressureful abutment thereof against the user's body.

Provided for mounting upon seat belt section A for the purpose of controlling the pressure thereof exerted against the user during usage, is a detent or stop member designated generally D, being readily fabricated, as by stamping, and comprising a flat plate body portion 14 being continuous in its lower portion with an outturned section or flange 17, the plane of which forms an angle of less than 90° with the plane of body portion 14. The side margins of said flange 17 are continuous with the side margins 16 of plate 14 while the transverse margin of flange 17 may be parallel with top margin 15 but being non-planar therewith. Centrally of each side margin 16 is an arm 18, which are mutually parallel and each of which is perpendicular to the plane of body portion 14. Said arms project from said body portion 14 in a direction therefrom opposite to that of flange 17.

Figure 7:
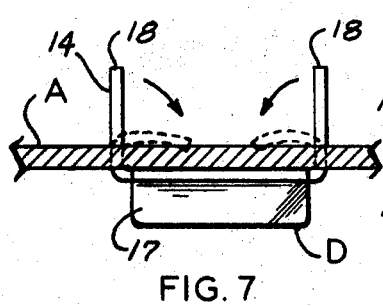
FIG. 7 is a horizontal transverse sectional view taken on the line 7—7 of FIG. 1.
Figure 6:
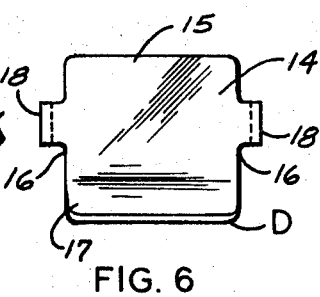
FIG. 6 is a front view of the detent, taken on the line 6—6 of FIG. 5.
Figure 5:
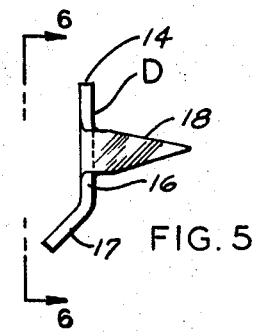
FIG. 5 is a side view of the detent.

Said detent D is mounted upon seat belt section A by causing arms 18, 18 to be forced through said seat belt, so that the outer ends of said arms extend beyond the outer side of said seat belt, whereupon said arms are caused to be bent backwardly toward said belt (as shown in FIG. 7) for thereby maintaining said detent D securely thereon. Thus, body portion 14 and arms 18 jointly act in the manner of a staple but with said body portion 14 being of relative extent so as to provide a face-to-face contact with the confronting inner surface of said belt A over a limited, but sufficient area to prevent any undesired rocking of detent A about an axis passing through the bent arms 18, 18. With detent D so mounted, flange 17 will project from the side of said belt A adjacent the user for purposes now appearing.

With seat belt A in extended, operative position, the same will pass in immediate proximity to the inward edge 19 of opening 2 by reason of the disposition of the same in engaged condition across the user and due to the fact that the same is under a retracted bias by spring 13. Flange 17 of detent D is so directed that it would abut against the top surface 20 of opening edge 19 depending upon its relative location on belt A and the size of the user. Accordingly, it is intended that detent D be positioned upon seat belt A to accommodate the individual user.

Figure 3:
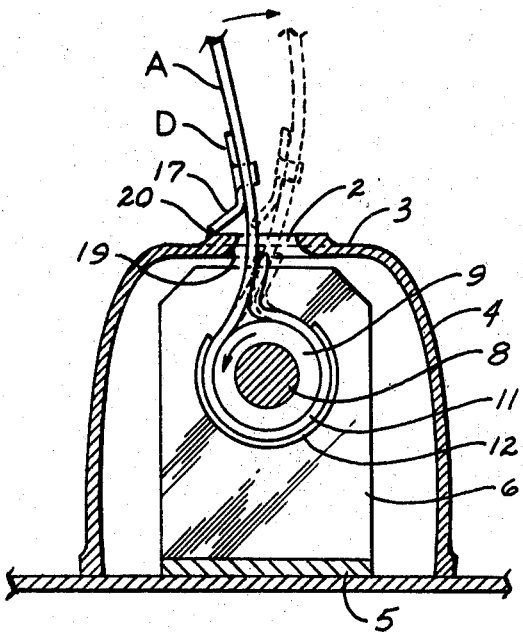
FIG. 3 is a vertical transverse sectional view taken on the line 3—3 of FIG. 2.
Figure 4:
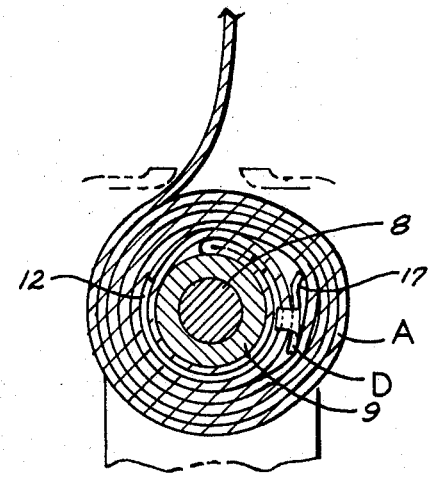
FIG. 4 is a vertical transverse sectional view taken on the line 4—4 of FIG. 2 but illustrating the seat belt in wound or retracted condition.

Normally, because of the tension exerted by spring 13, seat belt A will be quite tight against the user, causing an uncomfortable pressure to be exerted. By use of detent D, seat belt A may be so adapted as to assure proper safety of the seat occupant while being restrained against applying undue pressure. Thus, the user would place seat belt A in operative position and then pull upon seat belt A so as to withdraw same a distance from housing 4 which would allow of proper retention of the user but still not exert the discomforting force. With seat belt A so withdrawn, detent D may then be mounted upon the same immediately adjacent housing 4 so that flange 17 will abut said surface 20. By this arrangement, seat belt A will be prevented from being drawn into housing 4 under bias of spring 13 and thus, will comfortably extend across the user. The engagement between flange 17 and surface 20 is illustrated in FIG. 3. However, upon release of seat belt A for retracting purposes, the same, under influence of spring 13, will fall outwardly, within opening 2, as indicated in dotted lines in FIG. 3, effecting removal of flange 17 from contact with surface 20, and thereby permitting said belt portion A to be wound about drum 9 in fully retracted condition as shown in FIG. 4.

It is, of course, obvious that detent D can be easily mounted upon existing seat belts without removing the cover housing. With belt A fully extended, detent D may be stapled thereto by any suitable means such as special stapler for use either by an individual or by service personnel such as filling station attendants and the like. It is apparent that detent D can easily be secured by any convenient hand tool, such as a pair of pliers. With new equipment, detent D may be attached during assembly, as by an automatic machine-driven stapling tool.

Thus, with detent D, the individual user may adapt his seat belt, as in his own personal vehicle, for comfortable yet suitably snug use. It is obvious that belt A must have appropriate snugness so as to assure of continuous engagement between flange 17 and surface 20 during usage. If belt A is too loose, it is manifest that engagement therebetween might be lost.

Having thus described my invention what I claim and desire to obtain by Letters Patent is:

1. In combination with a flexible seat belt having normally inner and outer faces, means defining a housing, a shaft provided in said housing, means journaling said shaft, one end portion of said seat belt being fixed on said shaft, means spaced laterally of said housing for engaging the other end portion of said seat belt when in extended, operative condition wherein the inner face of said seat belt is disposed toward the user, means urging said shaft to rotate for effecting winding of said seat belt upon said shaft when in retracted, inoperative condition, said housing having a top wall with an opening for passage therethrough of said seat belt, the improvement comprising a stop member engageable upon the inner face of said seat belt, said stop member having a body portion, means integral with said body portion engageable with said housing top wall adjacent said opening for inhibiting movement of said belt into wound condition when in extended, operative codition, and said stop member being of less transverse extent than said opening so that upon release of said seat belt from extended, operative condition the same will move into said housing with said seat belt.

2. The combination as defined in claim 1 and further characterized by the body portion of said stop member being of flat plate-like character for surface-wise disposition against said inner face of said seat belt, and said means for engaging said stop member upon said seat belt comprising a pair of arms projecting from said body portion and extending through the seat belt.

3. The combination as defined in claim 2 and further characterized by said means integral with said body portion engageable with said housing being a flange projecting from said plate-like body portion in a direction opposite that in which said arms project.

4. The combination as defined in claim 3 and further characterized by said flange being disposed in a plane at an angle of less than 90° to the plane of the body portion.

5. The combination as defined in claim 4 and further characterized by said flange extending from the lower end of said body portion and projecting away from the adjacent face of said seat belt.

References Cited

UNITED STATES PATENTS

| | | | |
|---|---|---|---|
| 421,133 | 2/1890 | Grierson | 242—107.2 |
| 559,022 | 4/1896 | Barnes | 242—107.2 |
| 2,488,858 | 11/1949 | Franz. | |
| 2,607,549 | 8/1952 | Witchger | 242—107.2 |
| 3,020,001 | 2/1962 | Fischbein | 242—107.2 |
| 3,324,560 | 6/1967 | Snyder | 242—107.2 XR |
| 3,392,932 | 7/1968 | Kelsay | 242—107.2 |

STANLEY N. GILREATH, Primary Examiner

W. H. SCHROEDER, Assistant Examiner